United States Patent [19]

Whitehead

[11] Patent Number: 4,475,672

[45] Date of Patent: Oct. 9, 1984

[54] HOPPER DISCHARGE DEVICE

[76] Inventor: Jerald M. Whitehead, Idaho City Stage Rte., Idaho City, Id. 83631

[21] Appl. No.: 395,129

[22] Filed: Jul. 6, 1982

[51] Int. Cl.³ .............................................. B60P 1/56
[52] U.S. Cl. .................................... 222/561; 49/362; 74/422; 105/282 P; 298/27
[58] Field of Search ............................ 298/24, 27, 28; 105/282 R, 282 A, 282 P, 294 305; 49/362; 74/89.21, 422; 222/559, 561

[56] References Cited

U.S. PATENT DOCUMENTS

| | | | |
|---|---|---|---|
| 2,346,424 | 4/1944 | Griffith | 74/422 |
| 2,391,173 | 12/1945 | Loftus et al. | 74/422 X |
| 3,089,435 | 5/1963 | Floehr | 105/282 P |
| 3,204,578 | 9/1965 | Floehr | 49/362 X |
| 3,241,283 | 3/1966 | Ahlgren | 49/362 X |
| 4,301,741 | 11/1981 | Chierici | 105/282 P |
| 4,324,188 | 4/1982 | Fritz | 105/282 R |
| 4,324,434 | 4/1982 | Friese | 298/27 |

FOREIGN PATENT DOCUMENTS 560206 10/1932 Fed. Rep. of Germany ........ 49/362

Primary Examiner—Leslie J. Paperner
Attorney, Agent, or Firm—Paul F. Horton

[57] ABSTRACT

A hopper discharge device including a hopper with discharge opening, a pair of door support guides, a door slidingly engaging the guides for opening and closing the hopper discharge opening and a rotatable shaft with one or more sprocket wheels adapted to engage the door in rack and pinion manner for opening and closing the door. The door is provided on its undersurface with one or more longitudinally extending channel members, each channel member containing a section of roller chain therein. The sprocket wheels mesh with the rollers of the flexible roller chain to prevent build-up of ice, dirt, grain particles, and other debris in the sprocket wheel's contact with the chain. A wear strip of anti-friction material on the door facilitates the opening and closing of the door.

7 Claims, 3 Drawing Figures

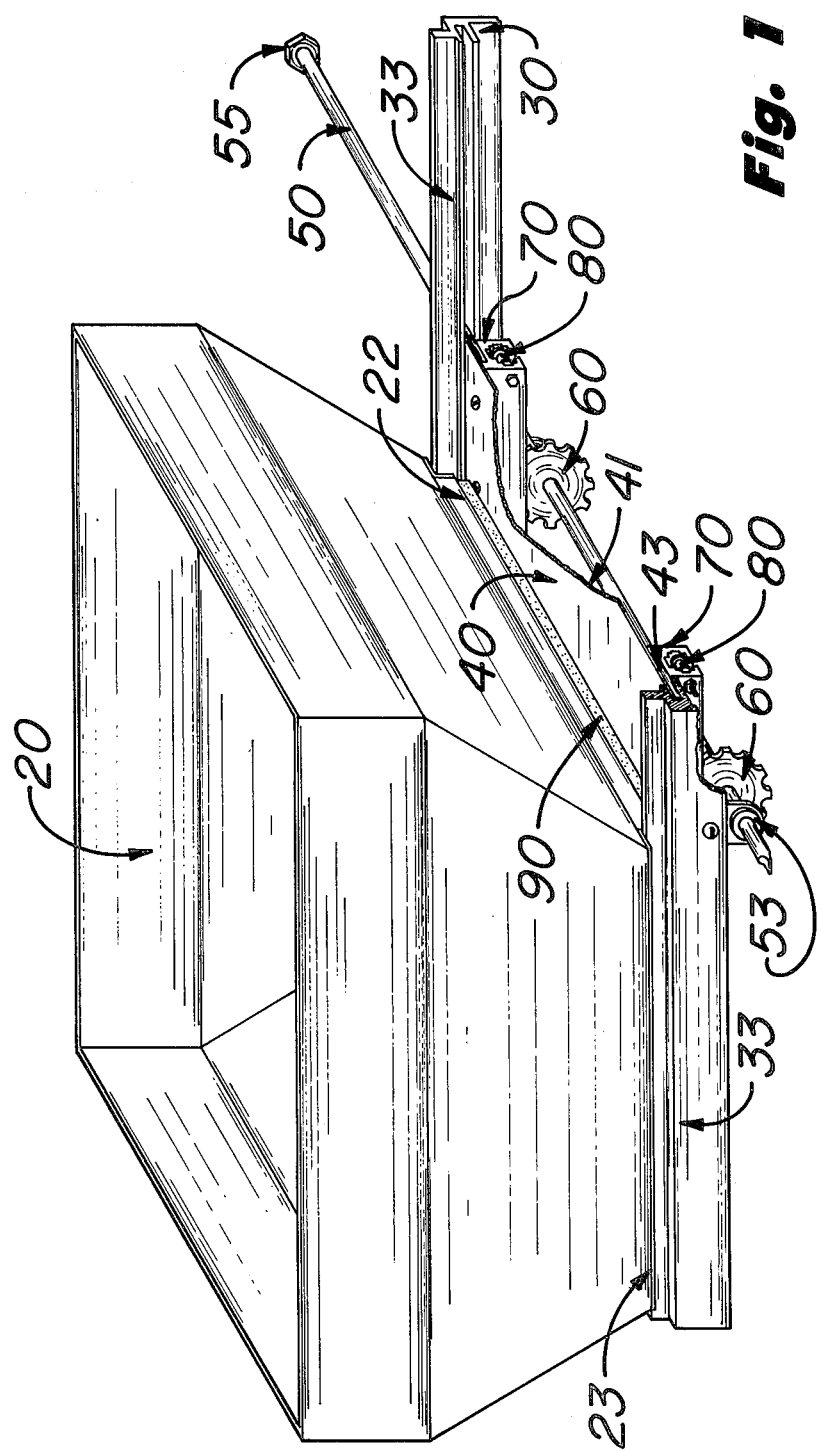

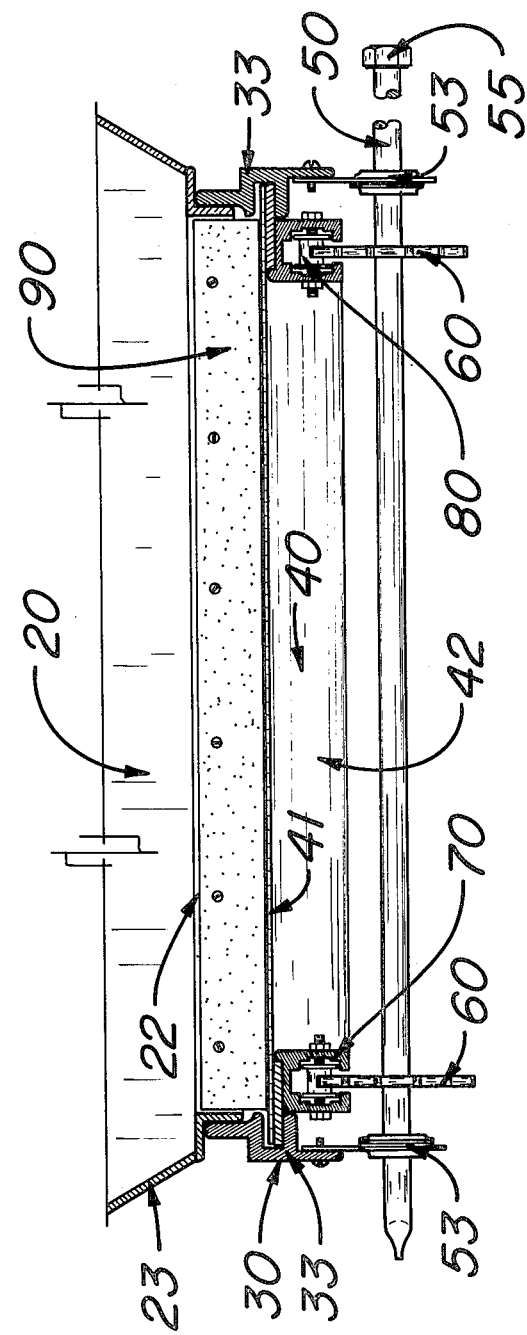

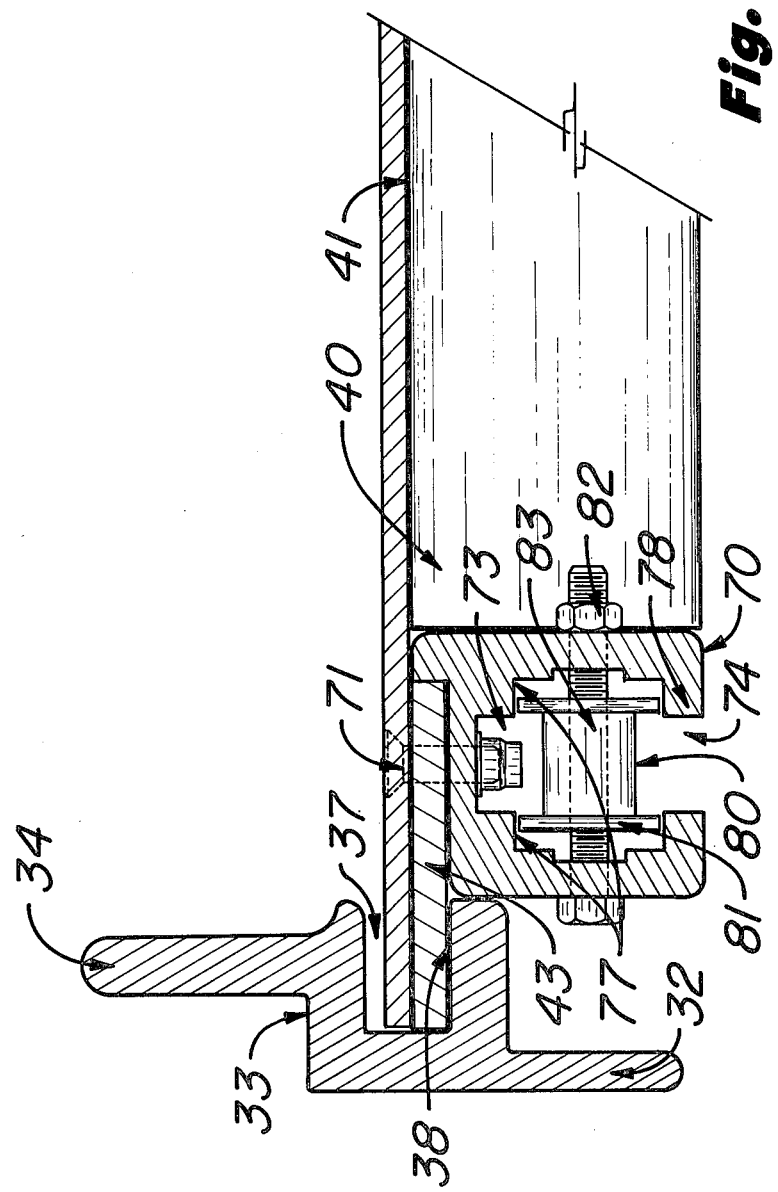

HOPPER DISCHARGE DEVICE

BACKGROUND OF THE INVENTION

1. Field of the Invention

This invention relates, in general, to hopper closure devices, and in particular, to self-cleaning devices.

2. Description of the Prior Art

Vehicles having hopper beds are widely used for transporting bulk materials, such as grain, because of the ease and efficiency of unloading. Most of the hoppers are of the type having a bottom gate or door which is conventionally opened and closed by means of a rack and pinion assembly. Because of its location, the door bears a large proportion of the weight of overlying material and therefore it is highly desirable to reduce the friction of the opening and closing mechanism as much as possible. In opening the hopper door, the friction between the door and overlying material must be overcome. A frequent problem associated with hopper doors is the caking and freezing of water mixed with dirt, grain, and other material in the rack and pinion assembly causing a jamming of the door. Freeing the door can be time consuming and expensive and may result in structural damage to the discharge assembly.

In attempting to solve this recurring problem, various devices have been invented, generally to prevent build-up of material on the rack and pinion assembly. Typical of such inventions are those disclosed in U.S. Pat. No. 2,989,931 issued to R. W. Joy; U.S. Pat. No. 3,085,517 issued to J. T. Smith; and U.S. Pat. No. 3,983,861 issued to J. H. Bagwell. Such systems, while representing an advance in the art, have only been partially effective in preventing build-up of form material and "freezing" of the hopper doors. Jamming of hopper doors is therefore still a common problem.

SUMMARY OF THE INVENTION

The present invention is a hopper discharge device including a door which is provided on its undersurface with a pair of channel members, substantially inverted U-shaped in cross section, each containing a plurality of rollers, preferably in chain form, which are operable to engage the sprockets of respective sprocket wheels for opening and closing the door. A complete description of the invention may be found in the claims appended hereto.

It is therefore a general object of the present invention to provide a hopper discharge device which prevents build-up of form material which might otherwise cause jamming of the hopper door.

It is another object of the present invention to provide a hopper discharge device which is designed to largely prevent accumulation of debris in the working mechanism and which self-cleans by shaking out any debris which enters the mechanism.

More particularly, it is an object of the present invention to provide a hopper discharge device which includes a door having one or more channel members, each including a plurality of rollers which are engageable with the sprockets of a sprocket wheel for opening and closing the door.

Even more particularly, it is an object of the present invention to provide a hopper discharge device which includes a door having one or more channel members, each channel member including a section of roller chain, the rollers of which are engageable with the sprockets of sprocket wheels for opening and and closing the door.

Additional objects and advantages will become apparent and more thorough and comprehensive understanding may be had from the following description taken in conjunction with accompanying drawings forming a part of this specification.

BRIEF DESCRIPTION OF THE DRAWINGS

FIG. 1 is an elevated perspective view of a hopper discharge device in accordance with the present invention.

FIG. 2 is an end view of the device.

FIG. 3 is an end section, in detail, of the door and door support of the present invention.

DETAILED DESCRIPTION OF THE INVENTION

Referring now to the drawings, and, more particularly to FIG. 1, an embodiment to be preferred of hopper discharge device 10 made according to the present invention is disclosed. Hopper discharge device 10 includes a hopper 20, a door support designated generally by the numeral 30, a door 40, shaft 50, and sprocket wheels 60.

Hopper 20 may be conventional in design and may be mounted on a stationary framework or, as preferred, on a vehicle such as a truck or railroad car. It is anticipated, as is usual, that the hopper will have a bottom discharge opening 22 defined by framework 23, but it is to be understood that the apparatus is useable with a hopper having a side or back opening and the claims appended hereto are to be understood in that context. The preferred embodiment of the invention is used with a hopper having a bottom discharge opening and therefore the specifications will be restricted thereto.

Door support 30 is secured to hopper 20 adjacent discharge opening 22 by any suitable means. In the preferred embodiment, a door support 30 includes two laterally spaced door guides 33 longitudinally extending adjacent the sides of discharge opening 22 of hopper 20. The door guides are preferably aluminum extrusions, modified F-shaped in cross-section and having an upwardly extending flange 34 which is secured to framework 23 of the hopper by suitable bolts, welding, or the like. Each of the guides is provided with a longitudinally extending slot 37 defining a track having a smooth door-supporting surface 38. The downwardly depending leg 32 of each guide may be used for attachment of shaft support bearings 53, shown to advantage in FIG. 2.

Door 40 includes a door panel 41, preferably having a smooth upper surface to reduce friction as it slides in engagement with overlying bulk materials such as grain. The door panel may include supporting framework 42 on opposing ends of the panel for strengthening the load-bearing door panel. The door panel is provided on its undersurface on each side with a wear strip 43 having a smooth undersurface for engaging the smooth top surface 38 of the track defined by each slot 37, as shown to advantage in FIG. 3. Wear strip 38 is manufactured from anti-friction materials such as polytetraflouroethylene sold under the trademark Teflon, or high molecular weight polypropylenes. The low friction wear strip, in its engagement with the smooth aluminum top surface of the track of each guide 33, works in cooperation with the sprocket-roller chain assembly, as will hereinafter be explained, to substantially reduce friction for superior opening and closure of the discharge opening 22 by the door.

The door is further provided with at least one, and preferably two, longitudinally extending channel members 70 attached to the undersurface of door panel 41 and supported by the door panel by means of a plurality of countersunk bolt assemblies 71 which also secure wear strips 43, in place. In this manner, channel members and wear strips may readily be replaced. Each of the channel members 70 is substantially inverted U-shaped in cross-section and defines a central cavity 73 having a bottom slotted opening 74. Channel members 70 are preferably made of aluminum extrusion. Each channel member carries a section of roller chain 80, each chain including links 81, pins, not shown, and evenly spaced, longitudinally aligned rollers 83. While rollers 83 may be individually mounted to each channel member, a roller chain is preferred because of ease of installation and replacement and because of self-cleaning factors which will hereinafter be explained. Each chain 80 is affixed within cavity 73 of channel member 70 by means of two or more bolt assemblies 82 extending through end rollers 83 as shown in FIG. 3. Each roller 83 is freely rotatable upon its pin. Links 81 are vertically supported with slight tolerance for vertical movement by opposing horizontally extending legs 78 defining slot 74 and by shelves 77 of the extrusion.

It is to be noted that the inverted U-shaped structure of the channel members are effective to prevent most material from entering cavity 73, housing the chain section 80, and thereby serves, in part, to prevent caking and freezing of debris which might jam the door. It is further to be noted that the rotation of rollers 83 in their contact with sprocket wheels dislodge foreign material which then drops through slot 74 of each of the channel members 70 to the ground. Additionally, the slight lateral movement of the chain links in respect to one another and the slight vertical movement of the chain links in their contact with leg 78 and shelf 77 of each channel member also promote the self-cleaning function of the invention.

Referring now to FIGS. 1 and 2, shaft 50, horizontally and rotatably mounted on support bearings 53, may be seen. Shaft 50 is mounted outwardly below and adjacent to channel member 70 and is provided with one or more sprocket wheels 60 secured to the shaft. The sprockets of each wheel 60 mesh with the rollers carried by each respective channel member for opening or closing door 40 upon rotation of the shaft. Shaft 50 may be provided with a hex-nut 55, hub, or the like, for rotating the shaft manually or may be connected to a motorized unit, not shown. A scraper 90, made of rubber or the like, may be affixed to framework 23 to engage the top surface of door panel 41 as the door is moved reciprocatingly on its support to clean the door and prevent loss of the bulk goods carried in the hopper as well as to prevent a build-up of the material on mechanical parts.

In operation, and assuming the hopper is filled with grain or other bulk products for discharge, the operator rotates shaft 50 in the proper direction by engaging hex-nut 55 with a wrench. As the shaft rotates, each of the sprocket wheels are rotated in their meshing engagement with rollers 83 of roller chain 80 causing door panel 41, which is affixed to the chain through each of the channel members 70, to move longitudinally on the door support, with wear strips 43 sliding on top surfaces 38 of guides 33, to open the door. The shaft is rotated in the opposite direction to close the door.

Having thus described in detail a preferred embodiment of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A hopper discharge device comprising:
   a hopper having framework defining a discharge opening;
   a door support secured to the framework;
   a door slidably mounted on said door support for opening or closing the discharge opening of said hopper, said door provided said channel members carrying a roller assembly, said roller assembly including a plurality of evenly spaced and longitudinally aligned rollers, wherein each of said channel members is substantially inverted U-shaped in cross-section and wherein each of said channel members include a pair of opposing horizontally extending legs defining a longitudinal slotted opening operable to receive a sprocket wheel, said legs operable to support links of said roller chain section and wherein each of said channel members include a pair of shelves operable to control upward movement of the links of said roller chain section;
   a horizontally extending shaft rotatably mounted outwardly adjacent each of said channel members; and
   at least one sprocket wheel secured to said shaft, each of said sprocket wheels meshing with the respective rollers of each channel member for opening or closing said door upon rotation of said shaft.

2. The apparatus as described in claim 1 wherein each of said roller assemblies comprise a section of roller chain.

3. The apparatus as described in claim 1 wherein said door support includes two laterally spaced door guides, each of said guides provided with a track, each track provided with a smooth door-supporting suface and wherein said door includes two laterally spaced antifriction wear strips, each of said strips operable to engage the smooth surface of a respective track.

4. A hopper discharge device comprising:
   a hopper having framework defining a bottom discharge opening;
   a door support including two laterally spaced horizontally disposed door guides, each of said guides including a door retention member substantially F-shaped in cross-section and provided with a smooth door-supporting track, a sidewall to prevent lateral movement of the door, and a horizontally extending shelf, parallel with and overlying the track to retain the door on the track, each of said F-shaped door retention members also including an upwardly extending flange engageable with the framework of said hopper for securing said door support to said hopper and a downwardly depending flange for supporting a shaft;

a door slidably mounted within said F-shaped door retention members of said door supports, said door provided on its undersurface with a pair of laterally spaced longitudinally secured channel members, each channel member having a bottom slotted opening and each channel member carrying an affixed section of roller chain having a plurality of evenly spaced rollers, wherein each of said channel members is substantially inverted U-shaped in cross-section and wherein each of said channel members include a pair of opposing horizontally extending legs defining a longitudinal slotted opening operable to receive a sprocket wheel, said legs operable to support links of said roller chain section and wherein each of said channel members include a pair of shelves operable to control upward movement of the links of said roller chain sections;

a horizontally extending shaft rotatably mounted on the downwardly depending flanges of respective door guides, each shaft provided with a pair of sprocket wheels for meshing with rollers of respective roller chain sections through the bottom slotted openings of each respective channel member whereby said door is opened or closed upon rotation of said shaft.

5. The apparatus as described in claim 4 wherein said door includes a pair of anti-friction wear strips, each strip operable to slidingly engage a track of respective guides of said door support.

6. The apparatus as described in claim 5 wherein each of said wear strips is made of polytetraflouroethylene.

7. The apparatus as described in claim 5 wherein each of said wear strips is made of polypropylene.

* * * * *